United States Patent [19]

Seki et al.

[11] Patent Number: 4,692,652
[45] Date of Patent: Sep. 8, 1987

[54] VIBRATION WAVE MOTOR

[75] Inventors: Hiroyuki Seki, Sagamihara; Takuo Okuno, Yokohama, both of Japan

[73] Assignee: Canon Kabushiki Kaisha, Tokyo, Japan

[21] Appl. No.: 843,551

[22] Filed: Mar. 25, 1986

[30] Foreign Application Priority Data

Mar. 29, 1985 [JP] Japan .................................. 60-066092
Jul. 12, 1985 [JP] Japan .................................. 60-153750

[51] Int. Cl.⁴ ........................................... H01L 41/08
[52] U.S. Cl. ..................................... 310/323; 310/328
[58] Field of Search ................................ 310/323, 328

[56] References Cited

U.S. PATENT DOCUMENTS 4,504,760 3/1985 Yamamoto et al. ............ 310/328 X
4,562,373 12/1985 Tokusima et al. ................ 310/328
4,562,374 12/1985 Sashida .......................... 310/323 X Primary Examiner—Mark O. Budd
Attorney, Agent, or Firm—Fitzpatrick, Cella, Harper & Scinto

[57] ABSTRACT

A vibration wave motor in which frequency signals are applied to electro-mechanical energy converting elements generates a travelling vibration wave on a vibratory member by two standing waves. The electro-mechanical energy converting elements are joined to the vibrating member so as to maintain the balance between the two standing waves.

6 Claims, 9 Drawing Figures

VIBRATION WAVE MOTOR

BACKGROUND OF THE INVENTION

1. Field of the Invention

This invention relates to improvements in a vibration wave motor for driving a moving member by a travelling vibration wave.

2. Description of the Prior Art

A vibration wave motor has a number of electromechanical energy converting elements, such as electrostrictive elements, adhesively disposed on a vibratory member formed of a resilient material along the direction of travel of a moving member, such that a flexural travelling wave is generated in the vibratory member. A drive force resulting from the vibration wave motion, The frictionally driven moving member placed on the vibratory member An example of such motor according to the prior art is shown in FIGS. 1 and 2 of the accompanying drawings.

In FIGS. 1 and 2, reference numeral 1 designates a vibratory member of a resilient material forming an elliptical closed loop comprising two straight portions and two arcuate portions. Reference numeral 2 denotes a number of electrostrictive elements joined to the vibratory member 1. The electrostrictive elements 2 are disposed in A phase and B phase on the two straight portions of the vibratory member 1 and with a phase difference of ¼ wavelength ($\lambda/4$) between the two phases A and B, and are joined to the underside of the vibratory member 1 so that in the respective phases, the adjacent elements are arranged at an interval of ($\lambda/2$) and are alternately opposite in polarity such as + and −. Reference numeral 3 designates a moving member in frictional contact with the upper surface of the vibratory member 1, and reference numeral 4 denotes a vibration preventing support member for the vibratory member 1.

Alternating voltages of the same frequency having a time phase difference of 90° therebetween are applied to the electrostrictive elements 2 in the A phase and the B phase. Thereupon, two standing waves of flexural vibration by the electrostrictive elements in the A phase and the B phase are generated in the vibratory member 1, but since as described above, the A phase and B phase spatially deviate from each other by ($\lambda/4$) and have a time phase difference of 90° therebetween, a travelling wave of flexural vibration is generated in the vibratory member 1 as a result of the combination of these standing waves. In this travelling wave of flexural vibration, the points on the neutral surface in the vertical thickness of the vibratory member (the intermediate surface in the vertical thickness) only vibrate in a vertical direction, while the points on the upper and lower surfaces of the vibratory member effect a kind of elliptical motion comprising a combination of vertical and circumferential vibrations with respect to the vibratory member. Accordingly, the moving member in contact with the upper surface of the vibratory member 1 is driven for movement along the vibratory member 1 by the friction force in the contact portion thereof.

A vibration wave motor using a circular vibratory member instead of an elliptical vibratory member is also known and the principle of the driving thereof is similar to what has been described above.

In an elliptical type vibration wave motor, the vibratory member has straight portions and arcuate portions, and the vibration mode when a standing wave has been generated is complicated as compared with a simply circular or straight beam. This is due to the fact that the arrangement of the electrostrictive elements is not symmetrical with respect to the minor axis of the ellipse and that because generally in the vibration wave motor, the electrostrictive elements 2 are joined to the vibratory member, the rigidity of the vibratory member in the joined portion thereof differs from that of the other portions and the vibration mode is further complicated as compared with the case of a single-piece vibratory member. For this reason, as previously described, standing waves have a spatial phase difference of ($\lambda/4$) in the A phase and the B phase, but deviation between wavelengths occurs due to the above-mentioned factor and the travelling wave comprising these two standing waves superposed one upon the other becomes non-uniform in amplitude, and this unavoidably leads to a disadvantage in the performance of the motor.

SUMMARY OF THE INVENTION

It is an object of the present invention to overcome the above-noted disadvantage found in the prior art and to provide an improved vibration wave motor in which vibration energy is efficiently transmitted to a vibratory member and the amplitude of the vibratory member is effectively taken out, whereby a travelling wave having uniform amplitude is obtained.

To achieve this object, the vibration wave motor according to the present invention in which a stator comprises an elliptical vibratory plate having at least two straight portions and accuate portions and two sets of electro-mechanical energy converting elements joined to the vibratory plate and a moving member on the vibratory plate is linearly driven by a travelling vibration wave generated in the vibratory plate by said elements is characterized in that said two sets of electro-mechanical energy converting elements are joined to the two surfaces of one straight portion of the vibratory plate with a phase difference corresponding to ¼ of the wavelength of said travelling vibration wave, the electro-mechanical energy converting elements on each of said surfaces being joined at positions symmetrical with respect to the center axis (minor axis) of the elliptical vibratory plate, and in order to efficiently generate orderly standing waves, the one straight portion of the vibratory member to which the electro-mechanical energy converting elements are joined is made thin by an amount such that its rigidity is equivalent to the rigidity of said energy converting elements or a material having rigidity equal to that of said energy converting elements is joined to that portion of the vibratory member to which the electro-mechanical energy converting elements are not joined, that is, the rigidity of said two straight portions is made uniform, thereby correcting the non-uniformity of the rigidity of the vibratory member resulting from the joining of the electro-mechanical energy converting elements thereto.

Other objects of the present invention will become apparent from embodiments which will hereinafter be described.

DESCRIPTION OF THE PREFERRED EMBODIMENTS

Figure 1:
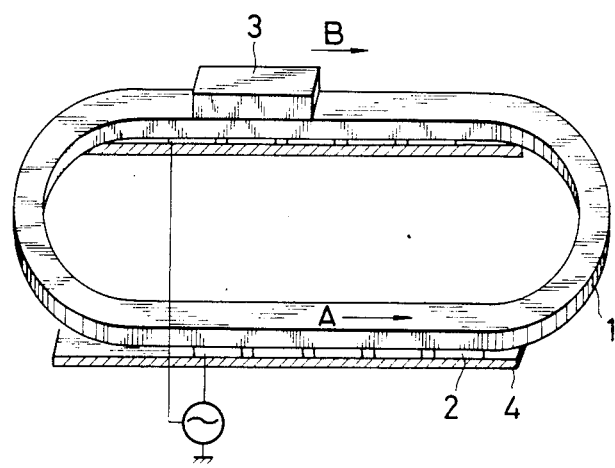
FIGS. 1 and 2 show a vibration wave linear motor according to the prior art and the construction of the stator of the same motor, respectively.
Figure 2:
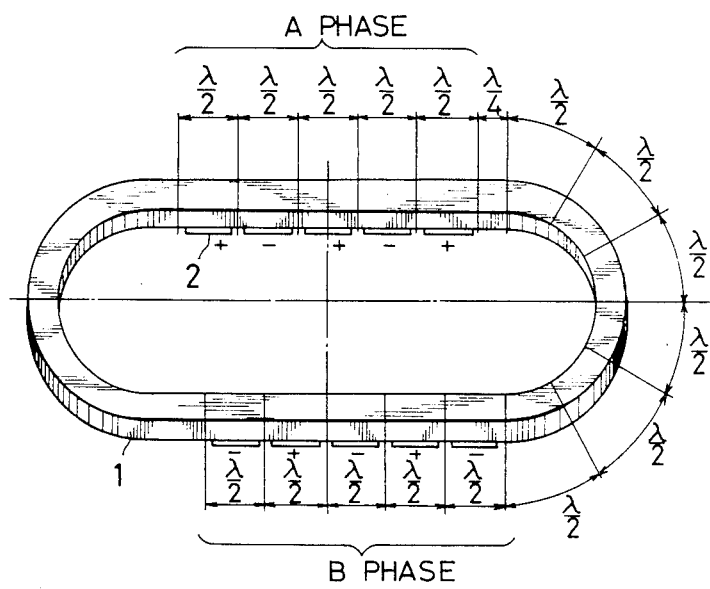
Figure 3:
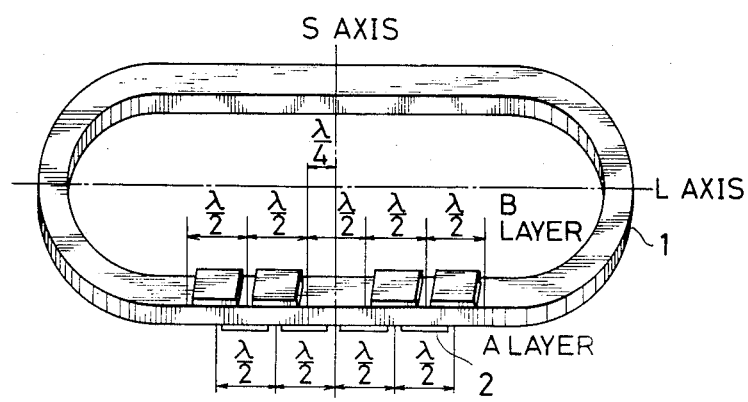
FIG. 3 shows the construction of a stator in an embodiment of of the vibration wave motor according to the present invention.
Figure 4:
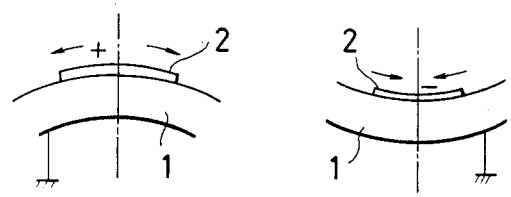
FIG. 4 illustrates the principle of the generation of a vibration wave.
Figure 5:
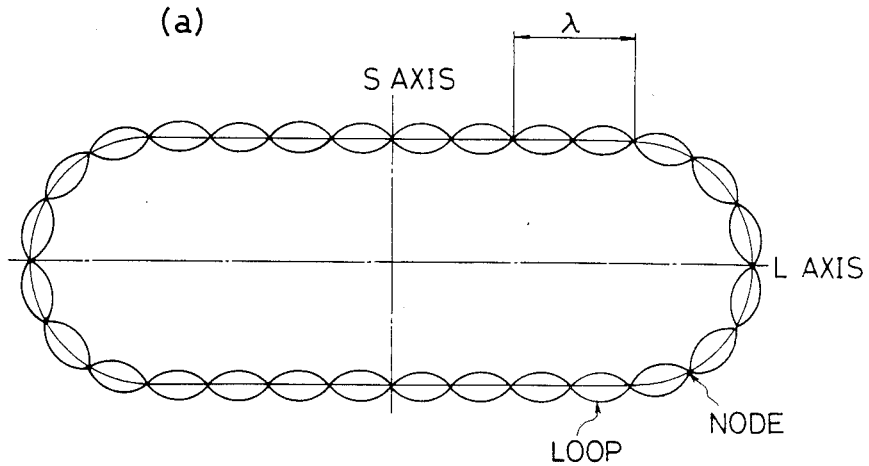
FIGS. 5(a) and (b) show the flexural vibration modes of the two kinds of standing wave of an elliptical vibratory plate.
Figure 5:
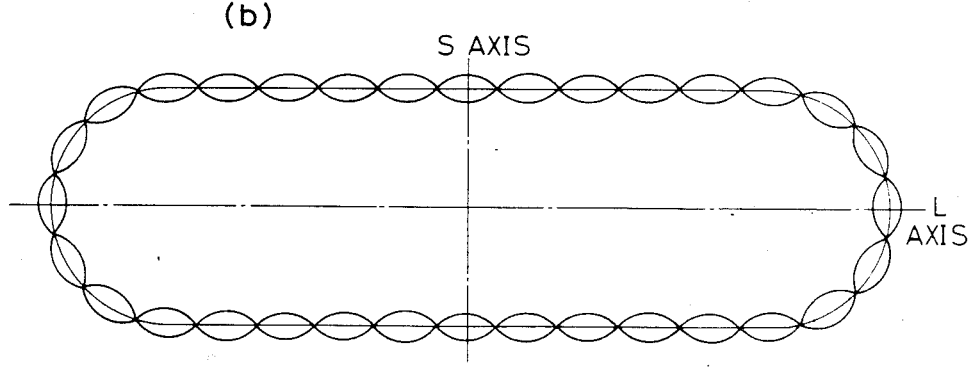

Referring to FIG. 3 which shows the construction of a stator of endless structure in an embodiment of the vibration wave motor of the present invention, reference numeral 1 designates a vibrator plate and reference numeral 2 denotes electrostrictive elements. When an alternating voltage is applied to electrodes on the front and back surfaces of an electrostrictive element 2, the electrostrictive elements 2 expands and contracts and therefore, if it is joined to the vibratory plate, the vibratory plate 1 will be bent as shown in FIG. 4 and effect such vibrations that the center of the electrostrictive element 2 is the belly of a standing wave. Also, the standing wave of the elliptical vibratory plate 1 has such a vibration characteristic that as shown in FIGS. 5(a) and (b), nodes are formed at positions symmetrical with respect to the axis of symmetry (minor axis) of the vibratory plate. Therefore, if the electrostrictive element is joined to the vibratory plate so that the position of the belly of the vibration mode of the standing wave shown in FIGS. 5(a) and (b) is coincident with the center of the electrostrictive element, the vibratory plate can be excited efficiently.

Also, by the electrostrictive elements 2 being joined to the vibratory plate 1, the rigidity of the joined portion is varied and vibrations of the uniform wavelength as shown in FIGS. 5(a) and (b) cannot be obtained, whereas in the straight portion on that side of the vibratory plate to which the electrostrictive elements are not joined, the influence of these is little and uniform vibrations can be obtained. Accordingly, if as shown in FIG. 3, A phase is formed on the surface of the straight portion on one side and B phase is formed on the back surface with a phase difference of ($\lambda/4$) with respect to the A phase, there can be obtained a travelling wave of uniform amplitude on the other straight portion. Also, in order to make the rigidity of the entire stator symmetrical with respect to the axis of symmetry (minor axis) S', the B phase extends through the central electrostrictive element as shown.

With the above-described construction, the driving frequencies of the A phase and the B phase coincide well with each other and efficient driving is possible.

Figure 6:
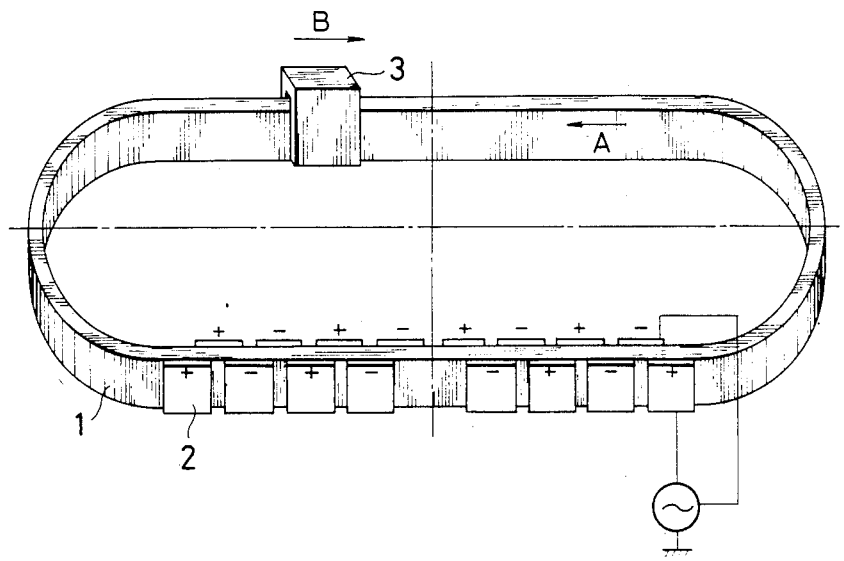
FIG. 6 shows another embodiment of the present invention.

FIG. 6 shows another embodiment of the present invention. In this embodiment, a vibratory plate 1 is of a rectangular cross-sectional shape having a great height relative to the width, and electrostrictive elements 2 are joined to the opposite sides of the straight portion on one side of the vibratory plate 1 with a phase difference of ($\lambda/4$). Alternating voltages having a phase difference of 90° therebetween are applied to A phase and B phase, and in the vibratory plate 1, a travelling wave is generated in the direction of arrow A indicated in FIG. 6, and a moving member 3 is driven in the direction of arrow B by this travelling wave.

Further, in the present invention, there is an embodiment in which the rigidity of the straight portion to which electrostrictive elements are joined is made equivalent to the rigidity of the straight portion to which electrostrictive elements are not joined.

Figure 7:
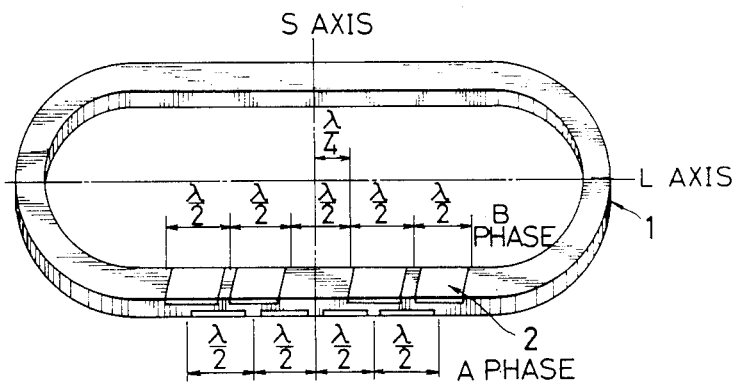
FIGS. 7, 8 and 9 are perspective views showing further embodiments of the present invention.

FIG. 7 shows an example of the construction of a stator in a vibration wave motor according to the present invention. In FIG. 7, reference numeral 1 designates a vibratory member, and reference numeral 2 denotes a number of electrostrictive elements joined to the vibratory member 1. The straight portion of the vibratory member 1 to which the electrostrictive elements 2 are joined is planed by an amount corresponding to the rigidity equivalent to the rigidity of the electrostrictive elements 2, and is corrected so that non-uniformity of rigidity relative to the non-joined portion does not occur when the electrostrictive elements 2 are joined to said straight portion. Although not shown, a moving member is mounted on the vibratory member 1.

Figure 8:
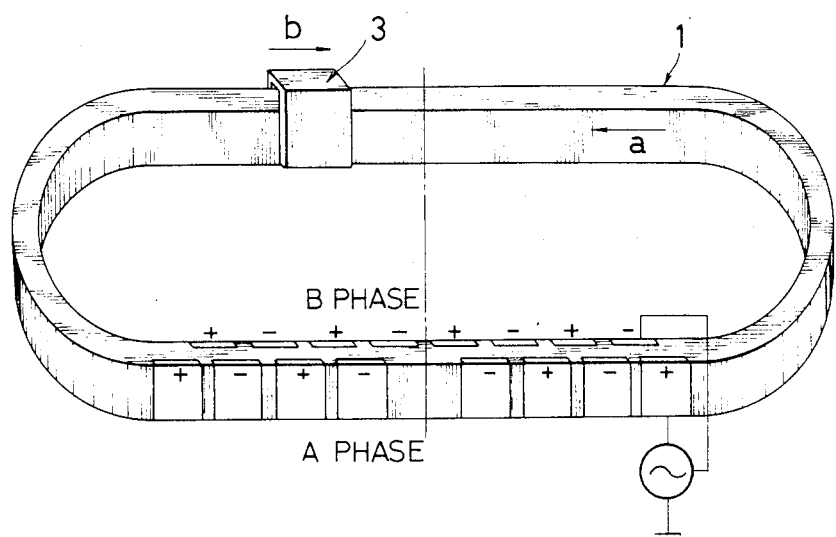

FIG. 8 shows still another embodiment of the present invention. In this embodiment, a vibratory member 1 is of a rectangular cross-sectional shape having a great height relative to the width, and the portion thereof to which electrostrictive elements 2 are joined is planed so that the flexural rigidity in a direction perpendicular to the joined suface is not non-uniform relative to the portion of the vibratory member to which electrostrictive elements are not joined.

Figure 9:
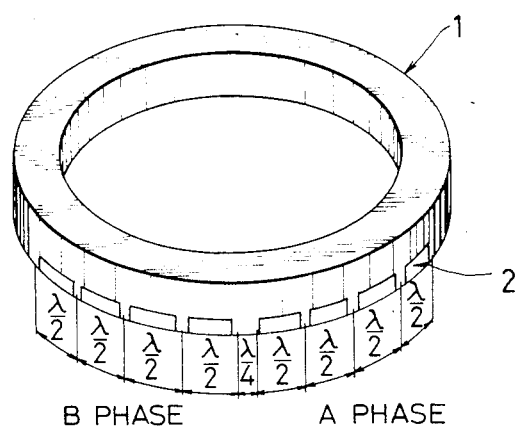

FIG. 9 shows an embodiment of the present invention which uses a circular vibratory member. A phase and B phase electrostrictive elements 2 are disposed on the underside of a circular ring-like vibratory member 1 while being deviated from each other by ($\lambda/4$) and arranged at a pitch of ($\lambda/2$) in the respective phases, and alternating voltages having a phase difference of 90° therebetween are applied to A phase and the B phase. As clearly shown in FIG. 9, the portion of the vibratory member 1 to which the electrostrictive elements 2 are joined is planed so that the rigidity of the vibratory member when the electrostrictive elements 2 are joined thereto is uniform.

In the above-described embodiments, the electrostrictive elements joined to the vibratory member may be replaced by electro-mechanical energy converting elements such as magnetostrictive elements.

From the foregoing description, it will be seen that the present invention has the following features:

1. Vibration energy can be efficiently transmitted to the vibratory plate.

2. The amplitude of the vibratory plate can be effectively taken out due to item 1 above.

3. A travelling wave uniform in amplitude is obtained.

4. The difference between the driving frequencies of the A and B phases can be made small.

What is claimed is:

1. A vibration wave motor comprising:
   (a) elliptical shaped vibration means; and
   (b) electro-mechanical energy conversion means recessed into said elliptical shaped vibration means so as to make uniform the rigidity of said vibration means, the electro-mechanical energy conversion means being symmetrically arranged with respect to a minor axis of said vibration means.

2. A vibration wave motor comprising:

(a) elliptical shaped vibration means for generating a travelling vibration wave;

(b) a plurality of electro-mechanical energy conversion elements being recessed into a portion of the vibration means so as to make uniform the rigidity of said vibration means and said electro-mechanical energy conversion means being positioned symmetrically with respect to a minor axis of the vibration means, wherein a travelling vibration wave is produced in said vibration means when electrical signals having a phase difference therebetween are applied to said electro-mechanical energy conversion elements; and (c) movable means press-contacted to said vibration means and being adapted to be frictionally-driven by said vibration means.

3. A vibration wave motor according to claim 2, wherein said vibration means has one surface press-contacted to the movable means and an opposite surface for receiving said electro-mechanical energy conversion elements.

4. A vibration wave motor according to claim 2, wherein a portion of the said electro-mechanical conversion elements is provided on a first surface of the vibration means and and another portion of said electro-mechanical conversion elements is provided on a surface of the vibration means different from said first surface.

5. A vibration wave motor comprising:

(a) an elliptical vibration plate having at least two straight portions and two arcuate portions;

(b) two sets of electro-mechanical energy converting elements secured to said vibration plate; and (c) a movable member provided on said vibration plate and linearly driven by a travelling vibration wave generated in said vibration plate by said elements, wherein said two sets of electro-mechanical energy converting elements being arranged on two opposing surfaces of one straight portion of the vibration plate so as to have a phase difference corresponding to one-quarter of the wavelength of said travelling vibration wave, and wherein said electro-mechanical energy converting elements on each of said surfaces are positioned symmetrically with repsect to a minor axis of said elliptical vibration plate, and, the one straight portion of the vibration member to which said electro-mechanical energy converting elements are arranged is reduced in size by an amount such that its rigidity is equivalent to the rigidity of said energy converting elements, thereby correcting any non-uniformity of the rigidity of the vibration member resulting from the arrangement of the electro-mechanical energy converting elements thereon.

6. A vibration wave motor comprising:

(a) an elliptical vibration plate having at least two straight portions and two arcuate portions;

(b) two sets of electro-mechanical energy converting elements secured to said vibration plate; and (c) a movable member provided on said vibration plate and linearly driven by a travelling vibration wave generated in said vibration plate by said elements, wherein said two sets of electro-mechanical energy converting elements being arranged on two opposing surfaces of one straight portion of the vibration plate so as to have a phase difference corresponding to one-quarter of the wavelength of said travelling vibration wave, and wherein said electro-mechanical energy converting elements on each of said surfaces are positioned symmetrically with respect to a minor axis of said elliptical vibration plate, and, the one straight portion of the vibration member to which said electro-mechanical energy converting elements are arranged and a material having rigidity equal to that of said energy converting elements is secured to that portion of the vibratory member to which the electro-mechanical energy converting elements are not secured, thereby correcting any non-uniformity of the rigidity of the vibration member resulting from the arrangement of the electro-mechanical energy converting elements thereon.

* * * * *

UNITED STATES PATENT AND TRADEMARK OFFICE
CERTIFICATE OF CORRECTION

PATENT NO. : 4,692,652
DATED : September 8, 1987
INVENTOR(S) : Hiroyuki Seki, et al.

It is certified that error appears in the above-identified patent and that said Letters Patent is hereby corrected as shown below:

COLUMN 1

Line 17, "motion, The" should read
        --frictionally drives the--.

COLUMN 3

Line 2, delete "of" (second occurrence).
    Line 23, "expands and contracts" should read
        --expand and contract--.
    Line 25, "effect" should read --effects--.

COLUMN 5

Line 25, delete "and" (second occurrence).

Signed and Sealed this

Eighth Day of March, 1988

Attest:

DONALD J. QUIGG

*Attesting Officer*    *Commissioner of Patents and Trademarks*